United States Patent [19]

Allemand et al.

[11] Patent Number: 4,671,611
[45] Date of Patent: Jun. 9, 1987

[54] UNDERWATER OPTICAL FIBRE CABLE

[75] Inventors: Didier Allemand, Marck; Bernard Degoix; Thierry Dubar, both of Calais, all of France

[73] Assignee: Les Cables De Lyon, Clichy, France

[21] Appl. No.: 616,882

[22] Filed: Jun. 4, 1984

[30] Foreign Application Priority Data

Jun. 3, 1983 [FR] France ............... 83 09230

[51] Int. Cl.⁴ ........................................ G02B 6/44
[52] U.S. Cl. ..................... 350/96.23; 174/70 S
[58] Field of Search ............... 350/96.23; 174/70 R, 174/70 S, 96, 98

[56] References Cited

U.S. PATENT DOCUMENTS

| | | | |
|---|---|---|---|
| 4,239,335 | 12/1980 | Stiles | 350/96.23 |
| 4,288,144 | 9/1981 | Nakai et al. | 350/96.23 |
| 4,324,453 | 4/1982 | Patel | 350/96.23 |
| 4,365,865 | 12/1982 | Stiles | 174/70 R |
| 4,484,963 | 11/1984 | Anctil et al. | 350/96.23 |
| 4,505,541 | 3/1985 | Considine et al. | 350/96.23 |
| 4,523,805 | 6/1985 | Thompson | 350/96.23 |

FOREIGN PATENT DOCUMENTS

| | | |
|---|---|---|
| 0060180 | 9/1982 | European Pat. Off. . |
| 0079073 | 11/1982 | European Pat. Off. . |
| 2805585 | 8/1979 | Fed. Rep. of Germany ... 350/96.23 |
| 2052092 | 1/1981 | United Kingdom . |

Primary Examiner—William L. Sikes
Assistant Examiner—Frank González
Attorney, Agent, or Firm—Sughrue, Mion, Zinn, Macpeak and Seas

[57] ABSTRACT

An underwater cable according to the invention comprises in particular of an optical core protected by a PVC sleeve 6, an armoring made of steel or aluminum wires 7, surrounded by a copper or aluminum sleeve 8. Longitudinal sealing of the armoring is ensured by an adhesive compound 10 based on epoxy resin and polybutadiene and butadiene copolymers.

3 Claims, 2 Drawing Figures

UNDERWATER OPTICAL FIBRE CABLE

FIELD OF THE INVENTION

This invention is related to an underwater optical fibre cable and to the manufacturing device for such a cable.

The invention applies in particular to cables likely to be subjected to pressures between 600 and 700 bars.

BACKGROUND OF THE INVENTION

We know that an underwater optical fibre cable includes a central filament which has helical grooves on its periphery in which the fibres are laid, while the gaps are sometimes filled with a viscous compound. This structure is usually protected by an insulating tape and/or an insulating sleeve, in PVC for instance. In order to absorb the tensile forces applied to the cable, a supporting armouring of steel wires wound helically in contiguous turns is built around the optical corre of the cable; this armouring is in turn protected externally by an extruded copper sleeve or by a longitudinally welded tape which forms a sleeve.

This assembly is also covered by a protective insulating sleeve.

In case accidental damage caused to the cable was to make the outer sleeve and the copper sleeve break in a particular point, it is very important that no high pressure sea water can get under the armouring of the cable and deteriorate this cable on great lengths.

The aim of this invention is to ensure longitudinal sealing of the cable at the armouring level.

SUMMARY OF THE INVENTION

This invention concerns an underwater optical fibre cable which includes successively:

an optical core made of a filament with helical grooves on the outer surface in which optical fibres are laid and sunk in a viscous compound, this unit being protected by plastic tapes wound helically and by a PVC plastic sleeve, an armouring supporting the optical core and made of metal wires wound helically in contiguous turns, the metal of the wires being either steel or aluminium, a metal sleeve enclosing the said armouring, the metal of the sleeve being either copper or aluminium, characterised by the fact that the said plastic sleeve, the said metal wires and the internal side of the said metal sleeve are bound by an adhesive and thermosetting filling compound which is made of a mixture of epoxy resin and polybutadiene and acrylonitrile butadiene polymers as well as a hardener, the filling compound making regularly spaced out plugs along the armouring.

The epoxy resin/copolymers ratio is between 1/5 and 1/1.

It has been found that this filling compound gives vary satisfactory sealing between the PVC sleeve, the armouring and the metal sleeve, in spite of the essentially different characteristics of their constituting materials.

In all cases, the following compound according to the invention, allows the cable to stay flexible and unaffected by kinking.

Other characteristics and advantages of this invention become apparent from the following description which is given by way of a purely illustrative and non-limiting drawing.

DESCRIPTION OF THE PREFERRED EMBODIMENT

Figure 1:
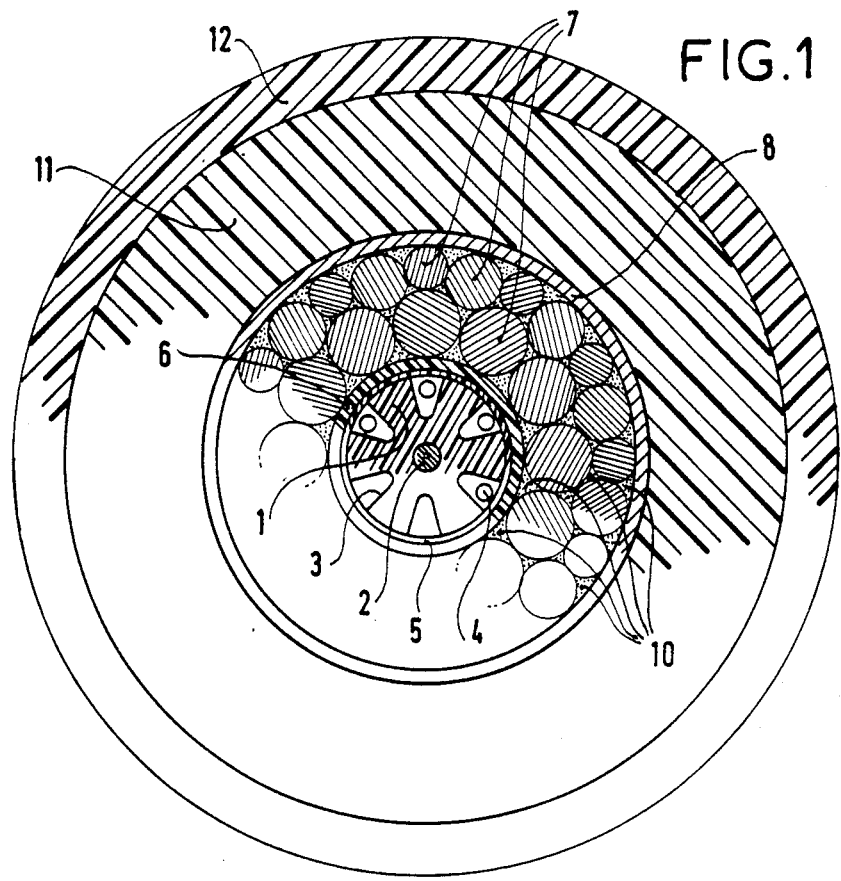
FIG. 1 is a transverse cross-section of a cable according to the invention.

FIG. 1 shows the optical core of the cable comprising of a plastic filament 1 reinforced by a steel strength member 2 with six peripheral helical grooves 3; each groove contains an optical fibre 4 generally sunk in a viscous. To make the drawing clear, FIG. 1 has only been partially hatched. A plastic tape 5 surrounds this assembly which is in turn protected by a PVC sleeve 6. This sleeve can be approximately a few tenths of a millimeter thick.

The armouring supporting this optical core is made of steel wires 7 wound helically to make a reinforcing layer which is held in a copper sleeve 8.

The polyethylene insulating sleeves have been referenced 11 and 12.

According to the invention, a filling compound 10 is provided, which sticks to the wires of armouring 7, to the inner side of copper sleeve 8 and to the outer wall of PVC sleeve 6, and fills all the gaps in the armouring.

For this purpose, a mixture of epoxy resin and polybutadiene and butadiene copolymers in a ratio of 50/50 in weight, is injected in the stranding zone of the metal wires of the armouring. This product, which has a pot life of approximately 2 hours, does not run before polymerising, polymerises in approximately 7 days at 20° C. without withdrawal and does not produce any volatile or corrosive products which would react to the other materials present.

This mixture must preferably contain a hardener such as an amine.

It is desirable that the steel wires of the armouring be previously de-greased and treated adequately, eg. be phosphated.

Figure 2:
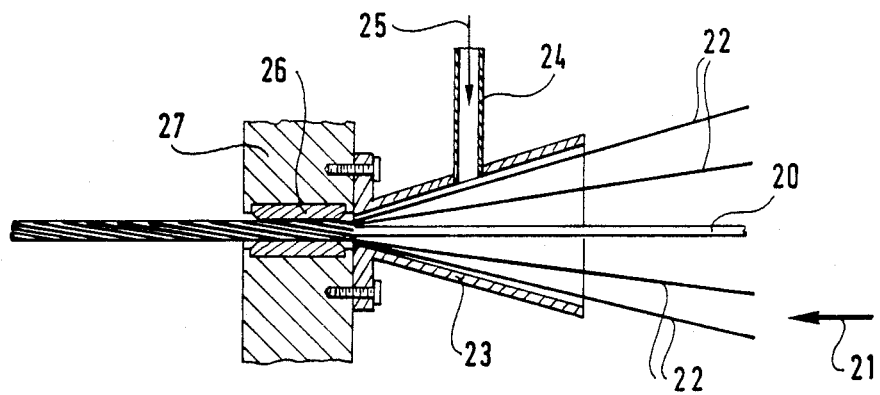
FIG. 2 shows a schematic transverse longitudinal cross-section of a manufacturing device for forming the cable of FIG. 1.

FIG. 2 shows a manufacturing device; 20 refers to the optical core of the cable with its PVC sleeve, moving in translation as shown by arrow 21. Steel wires 22 are supplied by coils and given motion to allow their stranding. A cone 23 is placed in the stranding zone and is fitted with a tube 24 for loading the filling compound 25, this product being injected in the stranding zone of the metal wires of the armouring.

During their movements in core 23, wires 22 are impregnated with non-runny product 25, come in contact with the PVC sleeve of optical core 20, and are passed through a compacting die 26 connected to a supporting device 27.

In accordance with a process, the wires are impregnated in such a way that plugs of a few meters long are formed and spaced out at a few hundred meter intervals.

In other cases, it can be of interest to make plugs a few centimeters long.

Cone 23 should preferably comprise of two parts, which make its removal and cleaning easier.

Of course this invention is not limited to the above described and illustrated manufacturing process. Without departing from the matter of the invention, it will be quite possible to replace any means by an equivalent means. Thus, the optical core could be made of optical fibres contained in plastic tubes filled with viscous material.

We claim:

1. In an underwater optical fiber cable including successively:
   an optical core, a PVC plastic protection sleeve (6) about said optical core,
   an armouring supporting the optical core, of helically wound wires (7) in contiguous turns about said plastic protection sleeve, said wires being of one metal of the group consisting of steel and aluminum,
   a metal sleeve (8) enclosing said armouring, said sleeve being of one metal of the group consisting of copper and aluminum, the improvement wherein said plastic sleeve (6), said metal wires (7) and the interior of said metal sleeve (8) are bound by an adhesive and thermosetting filling compound made of a mixture of epoxy resin and polybutadiene and acrylonitrile butadiene copolymers, as well as a hardener with the filling compound forming regularly spaced out plugs along the armouring, and wherein the weight ratio of epoxy resins and copolymers is between 1/5 and 1/1 such that the filling compound is highly resistant to tensile forces and said cable is flexible and uneffected by kinking during use.

2. The cable according to claim 1, wherein said plugs are a few meters long and spaced out at intervals of approximately a few hundred meters.

3. The cable according to claim 1, wherein the filling compound is injected in the stranding zone of the metal wires of the said armouring.

* * * * *